United States Patent [19]

Leiszter

[11] Patent Number: 5,149,108
[45] Date of Patent: Sep. 22, 1992

[54] MULTI-PIECE GASKET JOINT

[75] Inventor: Karoly Leiszter, West Allis, Wis.

[73] Assignee: Great Gasket Concepts, Inc., West Allis, Wis.

[21] Appl. No.: 657,162

[22] Filed: Feb. 15, 1991

[51] Int. Cl.$^5$ .............................................. F16J 15/00
[52] U.S. Cl. ...................................... 277/199; 277/192; 277/235 B; 403/364
[58] Field of Search ...................... 277/199, 192, 235 B, 277/220, 221; 403/339, 340, 364; 49/475, 479

[56] References Cited

U.S. PATENT DOCUMENTS

| | | | |
|---|---|---|---|
| 281,760 | 7/1883 | Gingras | 277/220 |
| 1,986,465 | 1/1935 | Dempsey | 277/199 |
| 3,204,300 | 9/1965 | Hofmann | 403/364 |
| 3,231,289 | 1/1966 | Carrell | 277/199 |
| 3,738,670 | 7/1973 | Jelinek et al. | 277/199 |
| 4,293,135 | 10/1981 | Wallace | 49/482 |
| 4,854,079 | 8/1989 | Karibe et al. | 49/479 |
| 4,993,724 | 2/1991 | Hauff | 277/221 |

FOREIGN PATENT DOCUMENTS 0843330  6/1939  France .................................. 403/364

Primary Examiner—William A. Cuchlinski, Jr.
Assistant Examiner—Daniel G. DePumpo
Attorney, Agent, or Firm—Andrus, Sceales, Starke & Sawall

[57] ABSTRACT

A multi-piece gasket utilizes pieces of elongated gasket material that have ends terminating in a number of longitudinally extending fingers with grooves disposed therebetween. The mating of the fingers and grooves defines a gasket joint and a seam line having a length greater than twice the width of the joined gasket pieces.

1 Claim, 1 Drawing Sheet

MULTI-PIECE GASKET JOINT

BACKGROUND OF THE INVENTION

The present invention relates to sealing gaskets and more particularly to a novel joint for joining a multi-piece gasket.

When relatively large gasket structures are to be utilized, sectional gaskets provide certain advantages with respect to manufacture, storage, handling and installation. Sectional gaskets can also be utilized to provide a variety of gasket shapes and sizes by joining gasket sizes together in different combinations.

Typical prior art gaskets are shown in U.S. Pat. Nos. 3,738,670 and 4,293,135. These multi-piece gaskets are joined by a customary tongue and groove or dovetail joint. These dovetail joints are very weak in the axial direction and generally will not support the joined gasket pieces sufficiently to allow handling of the assembled gasket during installation. The dovetail joint also does not provide an effective seal across the joint without using a supplemental sealant.

It is an object of the present invention to provide a gasket joint for a multi-piece gasket that provides a joint having superior strength so as to allow substantial handling of an assembled gasket during installation. It is also an object of the present invention to provide a gasket joint having superior sealing capabilities so as to eliminate the need for any supplemental sealant in the joint area.

SUMMARY OF THE INVENTION

A gasket joint for a multi-piece gasket includes a first piece of elongated gasket material that has at least one end terminating in a number of longitudinally extending fingers with grooves disposed between the fingers.

In accordance with another aspect of the invention, a second piece of elongated gasket material is provided with a number of longitudinally extending fingers with grooves disposed therebetween. The fingers are configured to be accepted by and frictionally held within the grooves of the corresponding gasket piece.

In accordance with still another aspect of the invention, the mating of the fingers and grooves defines a seam line that extends across the width of the joined gasket pieces and which has a total length greater than twice the width of the joined gasket pieces.

The joint design of the present invention thus provides a joint that has superior holding power to permit substantial handling of the assembled gasket and also provides a joint having superior sealing capabilities.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
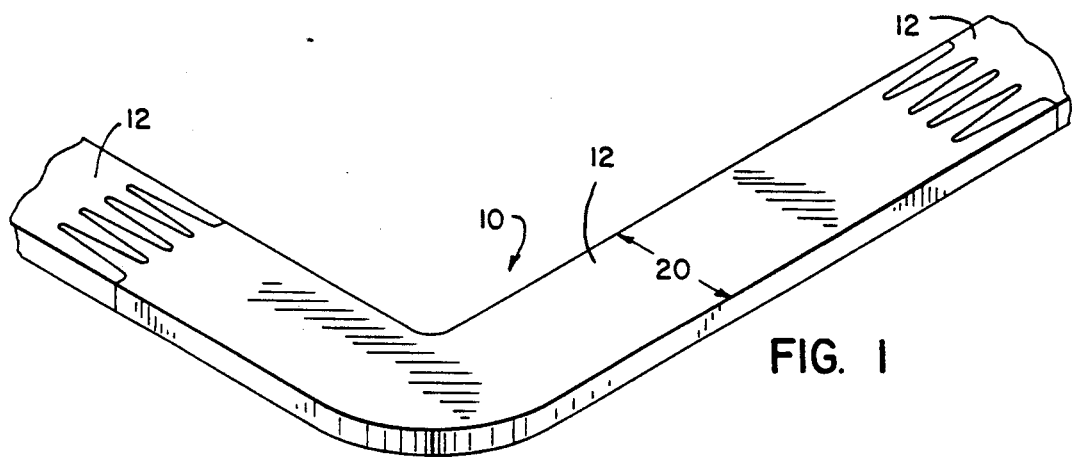
FIG. 1 is a plan view of a multi-piece gasket employing a joint constructed according to the present invention.

As shown in FIG. 1, a gasket 10 is formed from a plurality of elongated gasket pieces 12 joined in an end to end relationship.

Gasket pieces 12 are joined by providing the end of each gasket piece with a plurality of longitudinally extending fingers 14 having grooves 16 disposed therebetween. The fingers 14 of one gasket piece 12 mate with the grooves 16 of an adjacent gasket piece 12.

The mating of fingers 14 and grooves 16 defines a seam line 18 that winds across the width of gasket material 12. The zigzagging configuration of seam line results in a seam line that has a length greater than twice the width 20 of a gasket piece 12. Depending on the number of fingers and grooves utilized, the length of seam line 18 can be anywhere from three to six times the width 20 of gasket piece 12.

At times an adhesive is utilized when joining gasket pieces 12 and the application of adhesive to the greater surface area provided by elongated seam line 20 results in a connected seam that is even stronger than the gasket itself.

Figure 2:
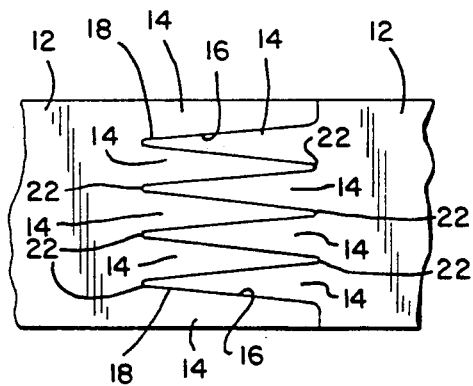
FIG. 2 is an enlarged plan view of the joint for the multi-piece gasket shown in FIG. 1.
Figure 3:
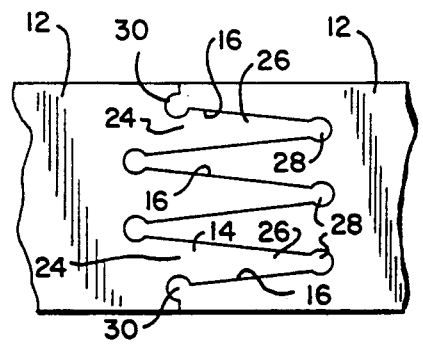
FIG. 3 is a plan view of an alternate embodiment of the joint in FIG. 2.
Figure 4:
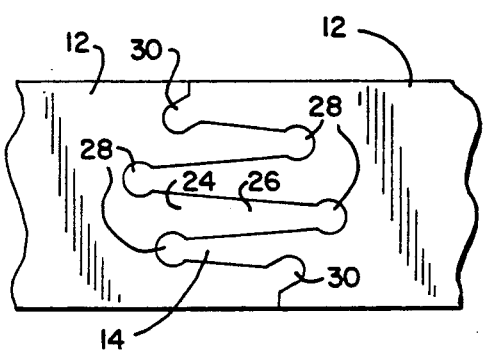
FIG. 4 is another alternate embodiment of the joint shown in FIG. 2.

FIGS. 3 and 4 illustrate an alternative embodiment for the configuration of fingers 14. The fingers shown in FIG. 2 are symmetric and taper to a point 22 disposed at the outer end of finger 14. In FIGS. 3 and 4, fingers 14 taper from a wide base portion 24 to a narrower outer portion 26. A rounded tip 28 is disposed at the end of outer portion 26 and is configured so as to have a diameter greater than the width of outer portion 26. Rounded portions 28 can be skewed slightly such as at 30 to enhance the locking feature of the fingers.

Various modes of carrying out the invention are contemplated as being within the scope of the following claims particularly pointing out and distinctly claiming the subject matter regarded as the invention.

I claim:

1. A multiple-piece gasket comprising:
   a first piece of elongated gasket material having at least one end terminating in a plurality of longitudinally extending fingers with a plurality of grooves disposed therebetween, said fingers having at least two different lengths and two different shapes with a rounded tip disposed on the end of said fingers,
   a second piece of elongated gasket material having at least one end terminating in a plurality of longitudinally extending fingers with a plurality of grooves disposed therebetween, said fingers having at least two different lengths and two different shapes with a rounded tip disposed on the end of said fingers,
   said fingers on said second piece configured to be accepted by and frictionally held within said grooves on said first piece and
   said grooves on said second piece configured to accept and frictionally hold said fingers on said first piece,
   the mating of said fingers and grooves defining a seam line extending across the width of the joined gasket pieces, the length of said seam line being greater than twice the width of the joined gasket pieces.

* * * * *